Patented Dec. 8, 1931

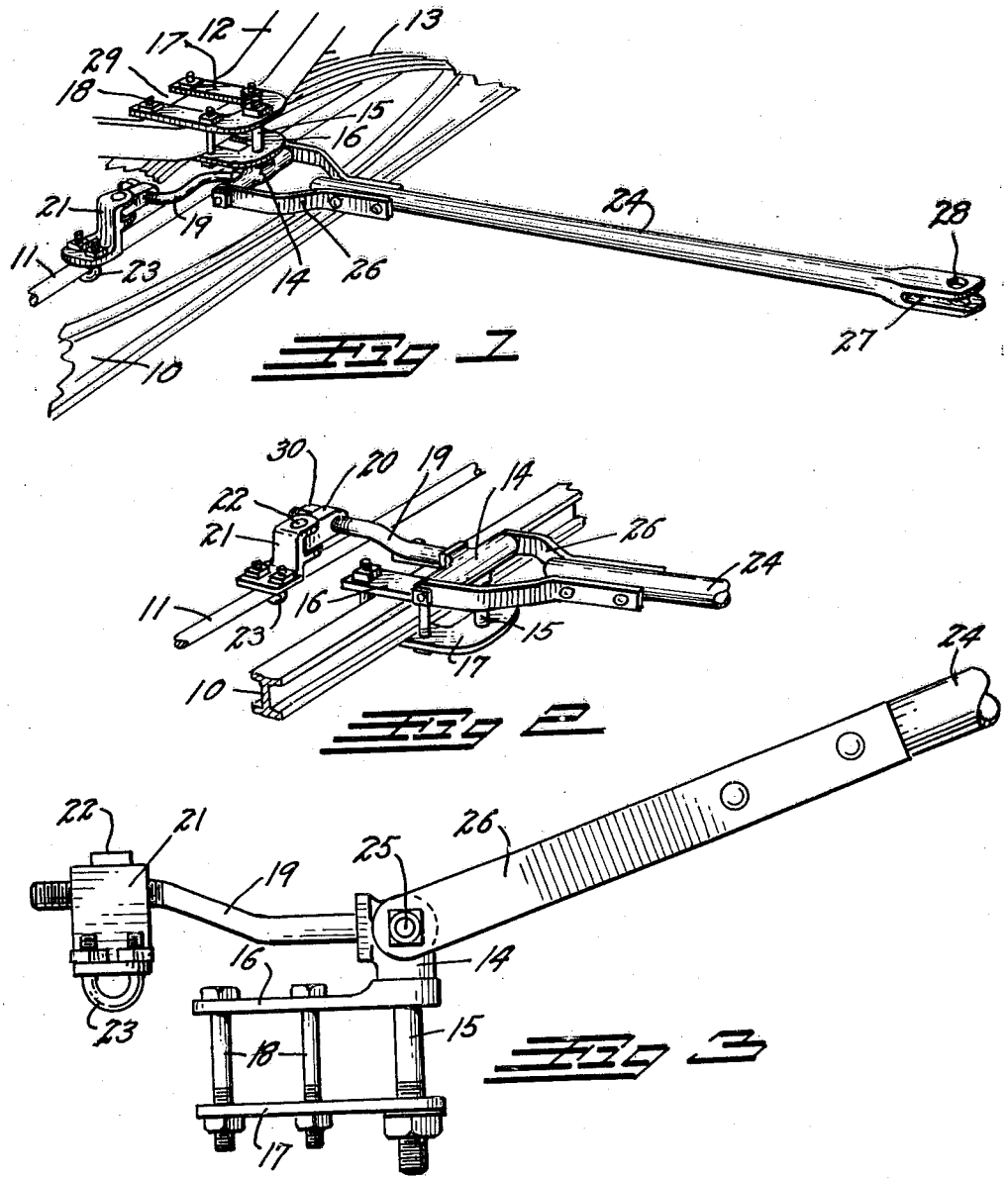

1,835,520

UNITED STATES PATENT OFFICE

ONTJE POEN, OF MATHESON, COLORADO

AUTOMOBILE TOWING ATTACHMENT

Application filed April 26, 1930. Serial No. 447,702.

This invention relates to an automobile towing device to be used for towing a trailer, or a series of trailers, or another automobile and has for its principal object the provision of a towing device which will be universal in its application to all types of auto trailers and automobiles, and which will co-operate with the spindle connecting rod of the steering apparatus of the towed automobile or trailer so as to control and guide the front wheels thereof.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 illustrates the invention as it would appear when applied to an automobile or trailer having a frame and spring construction similar to a "Model T Ford".

Fig. 2 illustrates the invention applied to a second type of automobile.

Fig. 3 is a side elevation of the attachment portion of the device.

In the drawings, the front axles of typical automobiles are indicated at 10; the steering spindle connecting rods at 11; the frame at 12; and the springs at 13.

The invention comprises a T-shaped head member 14 provided with a threaded pivot stud 15. The stud 15 passes through an upper clamp plate 16 and a lower clamp plate 17 which may be drawn together by means of suitable clamp bolts 18. In same types of automobiles the central portion of the frame is occupied by crank brackets, spring clips, etc. The plates 16 and 17 are U-shaped and have a central opening 29 which enables them to be passed around these obstructions.

A threaded steering bracket 19 projects from the head member 14 substantially at right angles to the stud 15. An adjusting lug 20 is threaded upon the steering bracket 19. A lock nut 30 is carried on the extremity of the steering bracket 19 by means of which the lug 20 may be locked in any desired position. An angle clip 21 is hinged to the adjusting lug 20 by means of a hinge pin 22, the foot of which carries a U bolt 23.

A towing bar 24 is hinged to the member 14 by means of a hinge pin 25 which passes completely through the T head of the member 14. The bar 24 is provided with a fork 26 through the extremities of which the hinge pin 25 passes. The forward extremity of the tow bar 24 is bifurcated, as shown at 27, and provided with a king pin opening 28 by means of which it may be attached in any desired manner to the towing vehicle.

Let us assume that it is desired to tow an automobile having a spring and frame construction of the type illustrated in Fig. 1. The clamp plates 16 and 17 are slipped over and under the frame 12 and the spring 13, and are clamped thereon by means of the clamp bolts 18, with the stud 15 extending upwardly from the member 14. The U bolt 23 is now clamped about the spindle connecting rod 11 and the towing vehicle is attached to the tow bar 24.

It will be seen that by this construction the towing vehicle in turning to the right will cause the steering bracket 19 to swing the spindle connecting bar 11 to the left. This will act to turn the wheels of the towed vehicle so that they will automatically follow in the tracks of the towing vehicle.

Should it be desired to attach the device to an automobile of the type having the spindle connecting rod 11 immediately behind the front axle 10, the clamp plates 16 and 17 are clamped to the axle 10 with the stud 15 extending downwardly and with the head member 14 on the top. This causes the steering bracket 19 to project rearwardly in the proper position for the U bolt 23 to be attached to the connecting rod 11. Should the steering rod 11 be found to be higher than the front axle the U bolt can be reversed so as to extend upwardly to reach the steering rod. Should the steering rod be below the front axle the clamp plates 16 and 17 may be reversed so that the steering bracket 19 will extend rearwardly under the front axle thus allowing the U bolt to conveniently engage the steering rod. The lug 20 can be adjusted along the steering bracket to suit varying distances between the axles and connecting rods of various cars.

It will be seen from the foregoing that the attachment is universal in its application and can be quickly applied to any type of automobile or trailer so as to actuate the steering mechanism thereof.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A towing attachment for automobiles comprising: a T-shaped head member; a pivot stud forming the stem of said head member; clamping means for engaging a part of said automobile; said stud being journaled in said clamping means; a tow bar; a fork on said tow bar; a hinge pin passing through said fork and through the T-shaped head of said head member; a steering bracket extending from said head member substantially at right angles to said pivot stud; and means for attaching said steering bracket to the steering rod of an automobile.

2. A towing attachment for automobiles comprising: an upper clamp plate; a lower clamp plate; means for drawing said two plates together against a member of said automobile, both said plates extending forwardly from said member; a T-shaped head member; a pivot stud forming the stem of said head member and extending through the forwardly projecting portions of both said clamp plates; a steering bracket extending rearwardly from said head member; an adjusting lug carried by said steering bracket; means for setting said lug in any desired position along said bracket; a clamp member hinged to said lug and adapted to engage the spindle connecting rod of the automobile; a towing bar; a fork on said towing bar, each furcation of which is hinged to one extremity of the head of said T shaped head member.

3. A towing attachment for automobiles comprising: an upper clamp plate; a lower clamp plate; means for drawing said two plates together against a member of said automobile, both said plates extending forwardly from said member; a T shaped head member; a pivot stud forming the stem of said head member and extending through the forwardly projecting portions of both said clamp plates; a steering bracket extending rearwardly from said head member; an adjusting lug carried by said steering bracket; means for setting said lug in any desired position along said bracket; a clamp member hinged to said lug and adapted to engage the spindle connecting rod of the automobile; a towing bar; a fork on said towing bar, each furcation of which is hinged to one extremity of the head of said T shaped head member; both said clamp plates being U-shaped so that they may pass around an obstruction on said automobile member and be clamped at both sides of said obstruction.

In testimony whereof, I affix my signature.

ONTJE POEN.